US009724611B2

(12) United States Patent
Heatherly (10) Patent No.: US 9,724,611 B2
(45) Date of Patent: Aug. 8, 2017

(54) METHOD AND SYSTEM FOR SYNCHRONIZING AN ONLINE APPLICATION AND A PORTABLE DEVICE

(75) Inventor: Christopher Heatherly, Monrovia, CA (US)

(73) Assignee: Disney Enterprises, Inc., Burbank, CA (US)

(*) Notice: Subject to any disclaimer, the term of this patent is extended or adjusted under 35 U.S.C. 154(b) by 2128 days.

(21) Appl. No.: 12/154,194

(22) Filed: May 21, 2008

(65) Prior Publication Data
US 2009/0292640 A1 Nov. 26, 2009

(51) Int. Cl.
G06F 21/00 (2013.01)
A63F 13/77 (2014.01)
A63F 13/79 (2014.01)
A63F 13/92 (2014.01)
A63F 13/358 (2014.01)
A63F 13/335 (2014.01)
A63F 13/30 (2014.01)
H04L 29/08 (2006.01)

(52) U.S. Cl.
CPC ............ *A63F 13/77* (2014.09); *A63F 13/12* (2013.01); *A63F 13/335* (2014.09); *A63F 13/358* (2014.09); *A63F 13/79* (2014.09); *A63F 13/92* (2014.09); *H04L 67/306* (2013.01); *A63F 2300/204* (2013.01); *A63F 2300/407* (2013.01); *A63F 2300/534* (2013.01); *A63F 2300/5546* (2013.01)

(58) Field of Classification Search
CPC .......... G06Q 20/1235; A63F 2300/537; H04L 67/306

USPC .................................................. 705/50–79
See application file for complete search history.

(56) References Cited

U.S. PATENT DOCUMENTS 6,119,229 A * 9/2000 Martinez et al. ............... 726/28
6,166,732 A * 12/2000 Mitchell et al. ............. 715/733
6,466,213 B2 * 10/2002 Bickmore ............... G06T 13/40
345/473

(Continued)

FOREIGN PATENT DOCUMENTS

WO  WO 01/77982   10/2001
WO  WO 02089437   11/2002
WO  WO 2006064058  6/2006

*Primary Examiner* — Steven Kim
(74) *Attorney, Agent, or Firm* — Farjami & Farjami LLP (57) ABSTRACT

There is provided a method of synchronizing a portable device with an online user account. The method comprises establishing a first connection between the portable device and an online application, receiving data from the online application concerning the online user account, including a persona, updating the portable device with a portable user account corresponding to the online user account, including the persona, terminating the first connection between the portable device and the online application, recording modifications to the portable user account on the portable device after terminating the first connection, establishing a second connection between the portable device and the online application, uploading the modifications to the portable user account recorded on the portable device to the online application, and updating the portable user account according to modifications to the online user account performed by the online application to synchronize the portable user account with the online user account.

20 Claims, 5 Drawing Sheets

(56) References Cited

U.S. PATENT DOCUMENTS

| | | | |
|---|---|---|---|
| 7,149,734 B2* | 12/2006 | Carlson | G06F 8/36 |
| 7,468,729 B1* | 12/2008 | Levinson | 345/473 |
| 7,475,078 B2* | 1/2009 | Kiilerich et al. | |
| 8,756,530 B2* | 6/2014 | Nicol et al. | 715/848 |
| 2001/0012774 A1* | 8/2001 | Muramatsu | 455/423 |
| 2002/0161476 A1* | 10/2002 | Panofsky et al. | 700/231 |
| 2003/0014423 A1* | 1/2003 | Chuah et al. | 707/102 |
| 2003/0065714 A1* | 4/2003 | Wong et al. | 709/203 |
| 2004/0205068 A1 | 10/2004 | Iyer | |
| 2005/0137015 A1 | 6/2005 | Rogers | |
| 2006/0178975 A1* | 8/2006 | Jung et al. | 705/35 |
| 2006/0294465 A1* | 12/2006 | Ronen et al. | 715/706 |
| 2008/0200250 A1* | 8/2008 | Orihara et al. | 463/31 |
| 2008/0255942 A1* | 10/2008 | Craft | 705/14 |
| 2008/0280684 A1* | 11/2008 | McBride et al. | 463/42 |
| 2008/0306951 A1* | 12/2008 | Rodefer | 707/9 |
| 2009/0158170 A1* | 6/2009 | Narayanan | H04L 67/38 715/753 |
| 2009/0251484 A1* | 10/2009 | Zhao et al. | 345/591 |
| 2009/0276718 A1* | 11/2009 | Dawson et al. | 715/753 |
| 2009/0285506 A1* | 11/2009 | Benson et al. | 382/299 |

\* cited by examiner

METHOD AND SYSTEM FOR SYNCHRONIZING AN ONLINE APPLICATION AND A PORTABLE DEVICE

BACKGROUND OF THE INVENTION

1. Field of the Invention

The present invention relates generally to online Internet applications. More particularly, the present invention relates to online Internet applications and portable devices.

2. Background Art

Online applications featuring user created personas, continuously refreshed content, and vast social communities are becoming increasingly popular in today's highly networked world. Free from the restraints of the physical world, these online applications enable users to indulge in character role playing that is impossible to experience in their everyday life and provides them with a creative outlet that is unrestrained by the societal norms of mainstream society.

Without physical boundaries, users are able to interact with individuals around the world that they may never have an opportunity to meet in real life. The non-confrontational communications medium of the Internet also enables normally shy and withdrawn individuals to express themselves more confidently online. A user that has difficulty establishing real life personal relationships often discovers that due to the physically removed nature of the Internet, a supportive social group is just a click away.

To relieve stress, have fun, explore alternative identities, and develop social relations, users spend significant amounts of time, money, and effort customizing their online persona, amassing virtual property, advancing their status, and interacting with the online community. Through these extended interactions, users develop strong emotional attachments with the online persona associated with their online user account, desiring ways to maximize quality time with their newly developed identity.

Although these online applications may provide very compelling user experiences, it is nearly impossible to continue these online experiences in a portable context due to the demanding hardware and connectivity requirements of these online applications. Supporting an online application that is compelling enough to attract and retain users requires large, powerful machines that consume substantial amounts of electricity. In addition, these online applications require a constant connection to the Internet, and will disconnect the user when connectivity to the Internet is lost. Thus, the online application experience is typically restricted to a stationary device at home that is plugged into a wall outlet, such as a large desktop computer or a video game console.

These bulky, immobile devices that are tethered to a wall do not satisfy the needs of today's busy and highly mobile user, who demands easily portable products that are pleasurable to use. To solve this problem, various kinds of portable devices have been developed. Mobile phones replace land line telephones; handheld video game systems substitute for large video game consoles; and media players such as mp3 or video players provide the functions the audio/video equipment rack satisfies at home. Small, light, and frugal on their limited power supply, these portable devices offer extended operational time away from a power outlet and can be easily held and carried by a user during travel. Their integration into modern life is often taken for granted, and many individuals carry one or more of them at all times.

However, the advantages offered by these portable devices are tempered by decreased processing power. Sacrifices are often necessary in component selection to balance the cost, size, and power requirements of the portable device, penalizing the device's performance. As a result, these lower performance portable devices are typically unsuitable to run online applications verbatim.

Although these online applications could conceivably be executed on a more powerful notebook computer, the characteristics of a typical modern notebook computer render it unsuitable as a truly portable device. High cost, limited battery life, unwieldy form factor, weight, and difficulties accessing the Internet away from home are some of the fatal disadvantages of using a notebook computer in an attempt to run online applications in a portable context.

Thus, portable devices provide an alternative by which a user can continue to develop his online persona without being tied to a stationary location. Although the portable device is offline from the online network, a user can still use the portable device to interact with a localized version of his online persona, a portable user account. However, the disadvantage is that the time spent and progress earned with the portable device is restricted to the portable device itself.

Accordingly, there is a need to overcome the drawbacks and deficiencies in the art by providing a way for a user of an online application to continue some of the experiences of the online application in the context of a convenient offline portable device while avoiding the loss of time spent and progress earned.

SUMMARY OF THE INVENTION

A method and system for synchronizing an online user account and a portable device, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present application is directed to a method and system for synchronizing an online user account and a portable device. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art.

The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
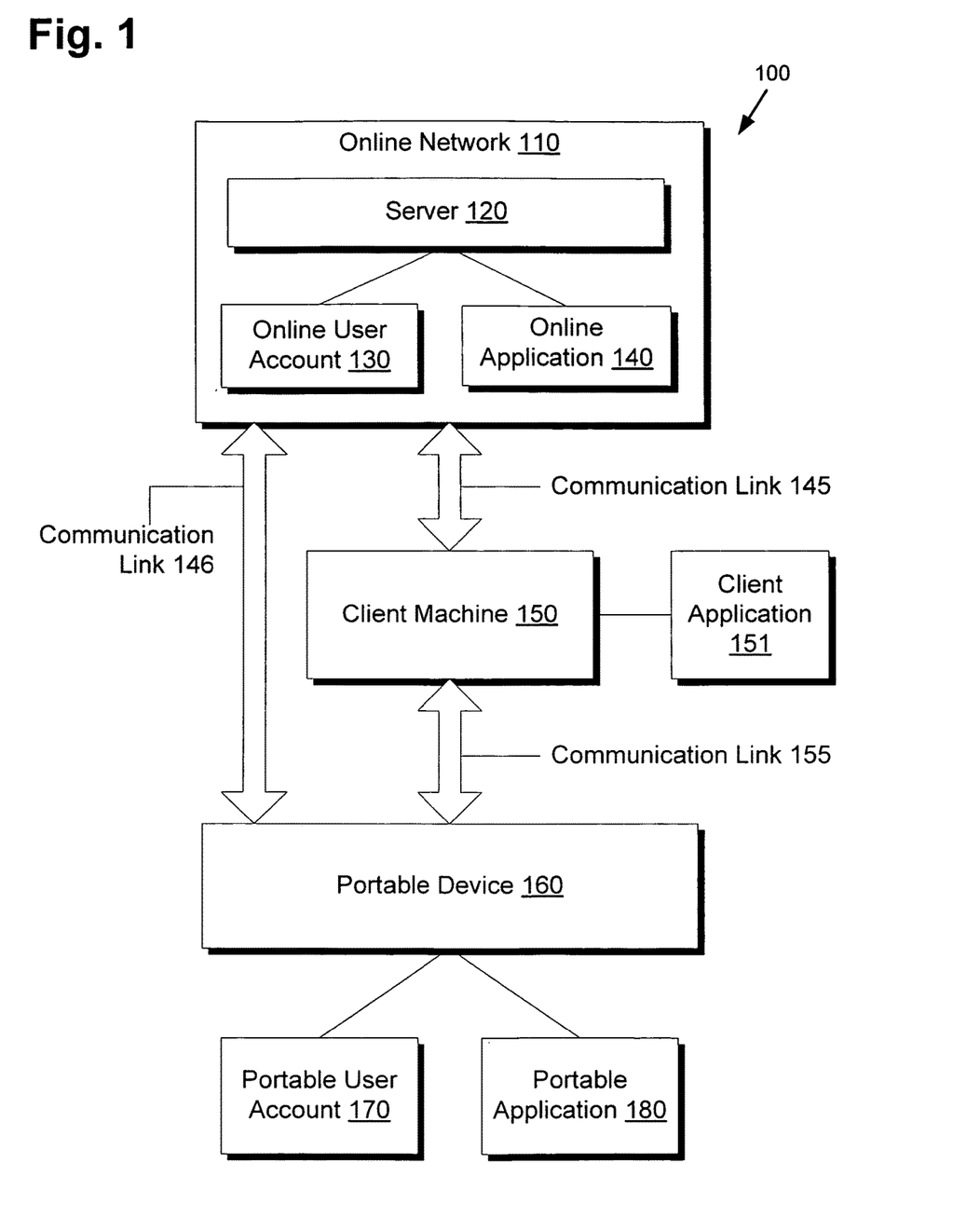
FIG. 1 presents a diagram of a system for synchronizing an online user account and a portable device, in accordance with one embodiment of the present invention.

FIG. 1 presents a diagram of an exemplary system for synchronizing an online user account and a portable device, in accordance with one embodiment of the present invention. Synchronization system 100 includes online network 110, client machine 150, and portable device 160. Online network 110 includes server 120, online user account 130, and online application 140. Client machine 150 includes client application 151. Portable device 160 includes portable user account 170 and portable application 180. Also included in FIG. 1 is communication link 145 connecting online network 110 to client machine 150, communication link 146 connecting online network 110 to portable device 160, and communication link 155 connecting client machine 150 to portable device 160.

Communication links 145 and 146 can be accomplished by a wired or wireless connection to the Internet, for example. Other embodiments may use another type of wide area network or another method of connectivity. Communication link 155 can be accomplished through a wired connector such as a Universal Serial Bus (USB) cable, for example. Other embodiments may use wireless communication though a local area network. For maximum flexibility, the present embodiment indicates that portable device 160 is capable of communicating both directly with online network 110 and indirectly using client machine 150 as an intermediary proxy. Client machine 150 can, for example, comprise a video game console or a personal computer such as a desktop PC or a laptop, which in turn can communicate with online network 110. In other embodiments, synchronization system 100 may include more or less elements than are shown in FIG. 1. In particular, client machine 150 may be removed from the system, leaving portable device 160 to assume the roles and duties of client machine 150. Thus, portable device 160 may rely on communication link 146 to communicate with online network 110, rather than through communication links 145 and 155. This configuration may be envisioned where online application 140 is simple enough to run directly on portable device 160, and does not need the help of client machine 150. Alternatively, advances in portable technology may render portable device 160 powerful enough to run online application 140 directly.

In yet another embodiment, portable device 160 may not have the ability to communicate directly with online network 110, thus removing the availability of communication link 146. This configuration may be envisioned where cost or design restraints limit portable device 160 to communicate with client machine 150 only.

It is noted that although the embodiment of FIG. 1 includes only one server 120 and one online user account 130, that particular implementation has been chosen to facilitate the present explanation. Online network 110 can include many servers and many online user accounts to support the large number of users that may be using online application 140 concurrently. In addition, although FIG. 1 shows direct access to the data encompassed by online user account 130 and online application 140, a real world implementation may include one or more database servers that are dedicated to the task of storing data, serving as data retrieval intermediaries for server 120. However, these implementation details, which are well known in the art, have been omitted from FIG. 1 for the sake of clarity.

According to the present embodiment, server 120 forms one node of online network 110. As indicated by the connected lines, server 120 is able to host both online user account 130 and online application 140. Online user account 130 holds all relevant details regarding the user, which will be explained in further detail in FIG. 2. Online application 140 contains all the logic necessary to receive modifications to portable user account 170 from portable device 160 and perform synchronization to online user account 130. Client machine 150 is able to connect to online network 110 via communications link 145 to run a client application 151, which is the corresponding client version of online application 140. Client machine 150 is also able to connect to portable device 160 via communications link 155 to act as a proxy for online application 140. In this intermediary client machine configuration, client application 151 may assist online application 140 in negotiating and transferring data with portable device 160. Portable device 160 is able to host both portable user account 170 and portable application 180, as indicated by the connected lines. Portable application 180 contains all the logic necessary to configure portable user account 170 based on corresponding online user account 130, and to record changes resulting from external input to portable user account 170 while disconnected from online network 110. Furthermore, depending on the design goals of portable device 160, portable application 180 may also contain all the logic necessary to resynchronize changes to online user account 130 back to portable user account 170.

Figure 2:
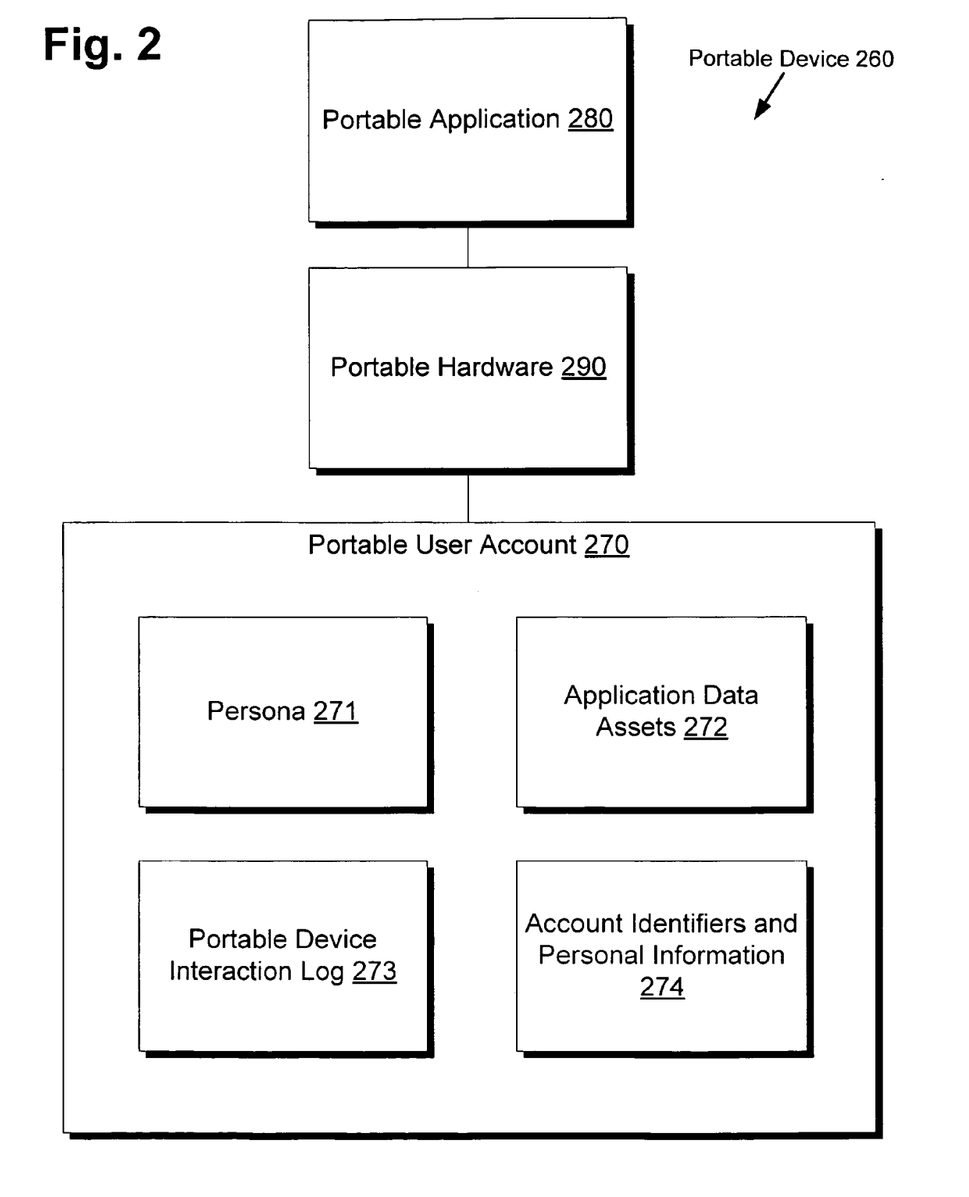
FIG. 2 presents a block diagram showing in greater detail an exemplary portable device suitable for use with a synchronization system such as one described in FIG. 1.

FIG. 2 presents a block diagram showing in greater detail an exemplary portable device suitable for use in synchronization system 100, in FIG. 1. Portable device 260, in FIG. 2, comprises portable hardware 290, portable application 280, and portable user account 270. Portable device 260, including portable application 280 and portable user account 270, corresponds to portable device 160, including portable application 180 and portable user account 170, in FIG. 1. The connected line between portable application 280 and portable hardware 290 indicates that portable application 280 is executed in the hardware environment provided by portable hardware 290. The connected line between portable hardware 290 and portable user account 270 indicates that portable hardware 290 can access and modify the data stored in portable user account 270 in conjunction with instructions from portable application 280.

Portable hardware 290, in FIG. 2, may include various hardware devices to support operation of portable device 260, such as, for example, a central processing unit (CPU) or simply a processor, random access memory (RAM), and wired or wireless communication means. In addition, portable hardware 290 may include various user interface devices such as, for example, a display that may be pressure sensitive, input devices such as buttons and joysticks, and environmental sensors such as a microphone and a camera. This hardware may be coordinated by some intelligent instruction, which is provided by portable application 280 in the form of program code that can be embedded in read only memory (ROM) chips, a hardwired printed circuit board (PCB), or a non-volatile rewriteable storage medium such as flash memory or a hard disk drive (HDD). The chosen implementation may turn on a balancing of cost, space, and functionality.

Utilizing portable hardware 290, portable application 280 may access portable user account 270 as a repository to store data sets corresponding to online user account 130 shown in FIG. 1. Like portable application 280, portable user account 270 may, for example, be stored on a non-volatile rewriteable storage device such as flash memory or an HDD. Although in FIG. 2, portable user account 270 and portable application 280 are shown as discrete blocks, in some embodiments they may reside on the same storage device. In one embodiment, portable application 280 may be removable by the user to support easy swapping of different portable applications. Moreover, in another embodiment, portable user account 270 may be removable by the user to support swapping of account data between different portable devices.

Examining FIG. 2 in greater detail, portable user account 270 is capable of hosting various data sets; in this particular embodiment, it includes persona 271, application data assets 272, portable device interaction log 273, and account identifiers and personal information 274. These data sets are merely representative of a wide variety of data that may be utilized to establish correspondence between portable user account 270 and online user account 130 in FIG. 1. Each of these exemplary data sets will be discussed in greater detail in separate paragraphs below.

Although in some embodiments there may be multiple personas associated with a single account, for the sake of clarity only one persona is shown in FIG. 2. An example of an embodiment with multiple personas is a fairy trading game; users collect and accessorize multiple fairies and trade them among their peers. In this particular example, the personas are not avatars of the users—the fairies do not particularly represent the user. However, there are embodiments where the persona could comprise an avatar of the user, in which the persona is a virtual representation of the user. This is often the case in an online role-playing game, where the concept is to role-play as a certain character. Persona 271 may comprise the physical, statistical, and social attributes corresponding to an online persona associated with online user account 130. Physical attributes, for example, may include visual appearance, equipment and clothing, and virtual possessions such as money, goods, real property and furnishings. Statistical attributes, for example, may include health and wellbeing, skills, strength, intelligence, experience and points. Social attributes, for example, may include group associations, fame, and relationships with other users. Combined, all these attributes paint a detailed description of the online character and its status within the online community.

Application data assets 272 may comprise data assets that are used to render portable user account 270 using portable application 280, which may include picture and image assets, music and sound assets, statistical data, story and text data, map data, and other resources. These assets may be preloaded onto the portable device, or they may be downloaded on demand or retrieved by some other mechanism.

Portable device interaction log 273 may contain a record of user interaction with portable device 260 for eventual use in a future synchronization. Such a record may include deeds accomplished, changes in clothing or appearance, items received, earning of money or other credits, and trades with other users, if portable hardware 290 supports communication with other portable devices. These records may be made while portable device 260 is offline. Once connectivity is established with online network 110 and synchronization occurs, portable device interaction log 273 may have an impact on online user account 130, which will be further detailed in the discussion below on FIG. 5.

Account identifiers and personal information 274 shown in FIG. 2 may contain, for example, information to identify and authenticate the user account, including encryption keys, hashes, personal information, and other unique identifiers. Portions of portable user account 270 may also be stored in encrypted form using methods well known in the art to prevent unauthorized modifications, hacking, and cheating. The decision to use strong or weak security may depend on the processing capabilities of portable hardware 290.

Figure 3:
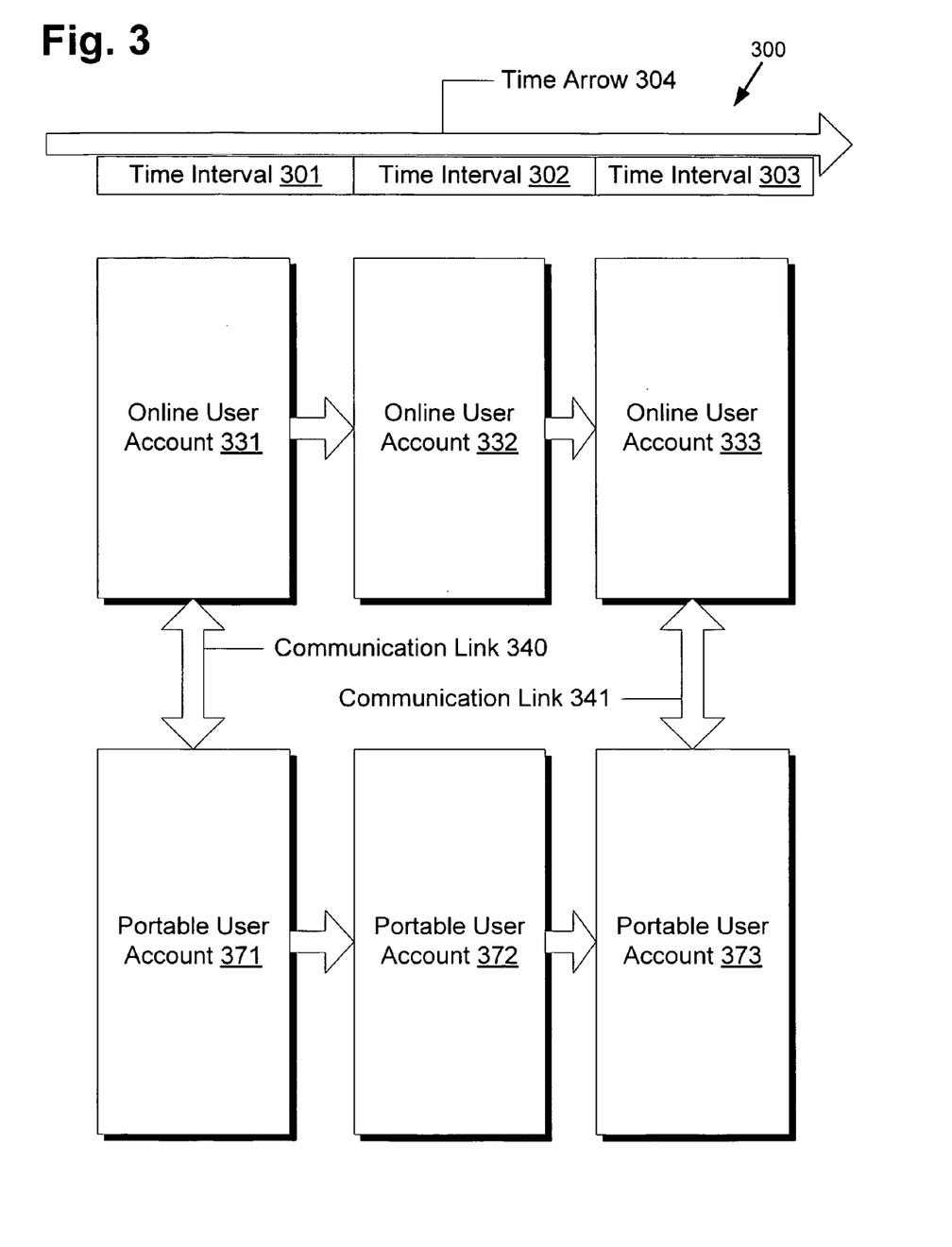
FIG. 3 presents a time progression diagram representing time related changes to an online user account and a corresponding portable user account, according to one embodiment of the present invention.

Turning now to FIG. 3, time progression diagram 300 is shown representing time related changes to an online user account and a corresponding portable user account, according to one embodiment of the present invention. Time progression diagram 300 includes online user accounts 331, 332, and 333, portable user accounts 371, 372, and 333, and communication links 340 and 341. Also shown in FIG. 3 is time arrow 304, which represents the progress of time moving forward to the right, with time intervals 301, 302, and 303 representing three significant time periods. For the sake of clarity, implementation details have been omitted from FIG. 3 in order to focus attention on changes occurring to online user accounts 331, 332, and 333, and portable user accounts 371, 372, and 373. A synchronization system such as synchronization system 100 in FIG. 1 will be providing the environment for time progression diagram 300 to operate.

Continuing with FIG. 3, online user accounts 331, 332, and 333 may represent the state of the account corresponding to online user account 130, in FIG. 1, during time intervals 301, 302, and 303 respectively. Similarly, in FIG. 3, portable user accounts 371, 372, and 373 may represent the state of the account corresponding to portable user account 170, in FIG. 1, during time intervals 301, 302, and 303 respectively. Although time intervals 301, 302, and 303 are depicted to be of approximately the same length, each time interval may be of any arbitrary length. Factors that may affect the time interval lengths include the processing speed of the synchronization and the length of time portable device 160 in FIG. 1 is offline.

At the earliest point in time or the leftmost side of time progression diagram 300, at time interval 301, online user account 331 and portable user account 371 may exchange data through communication link 340, which corresponds to communication link 146, or communication links 145 and 155, in FIG. 1. During time interval 301, data from online user account 331 may be downloaded and configured into portable user account 371. Although there may be circumstances where data is waiting to be synchronized from portable user account 371, for the purposes of clarity in this example, online user account 331 may be considered up-to-date when time interval 301 begins.

Moving to time interval 302, the lack of a communications link between online user account 332 and portable user account 372 indicates that portable device 160 in FIG. 1 may be in an offline state, disconnected from online network 110. In this offline state, portable device 160 in FIG. 1 may provide some kind of interactive element, for example, providing a game for a user to play. As a result of that interaction, changes may be made and recorded to portable user account 372. Similarly, changes may be occurring to online user account 332, depending on the program logic of online application 140 in FIG. 1, and the online connectivity of client machine 150, if available. Alternatively, in some embodiments, online application 140 of FIG. 1 may ignore online user account 332 in FIG. 3, leaving it in the same state as online user account 331.

At time interval 303, online connectivity may be reestablished by communication link 341, which corresponds to communication link 146, or communication links 145 and 155, in FIG. 1. During time interval 303, data from portable user account 373 may be uploaded and configured into online user account 333, thus synchronizing online user account 333. In addition, data from online user account 333 may be downloaded and configured into portable user account 373, thus synchronizing portable user account 373.

Figure 4:
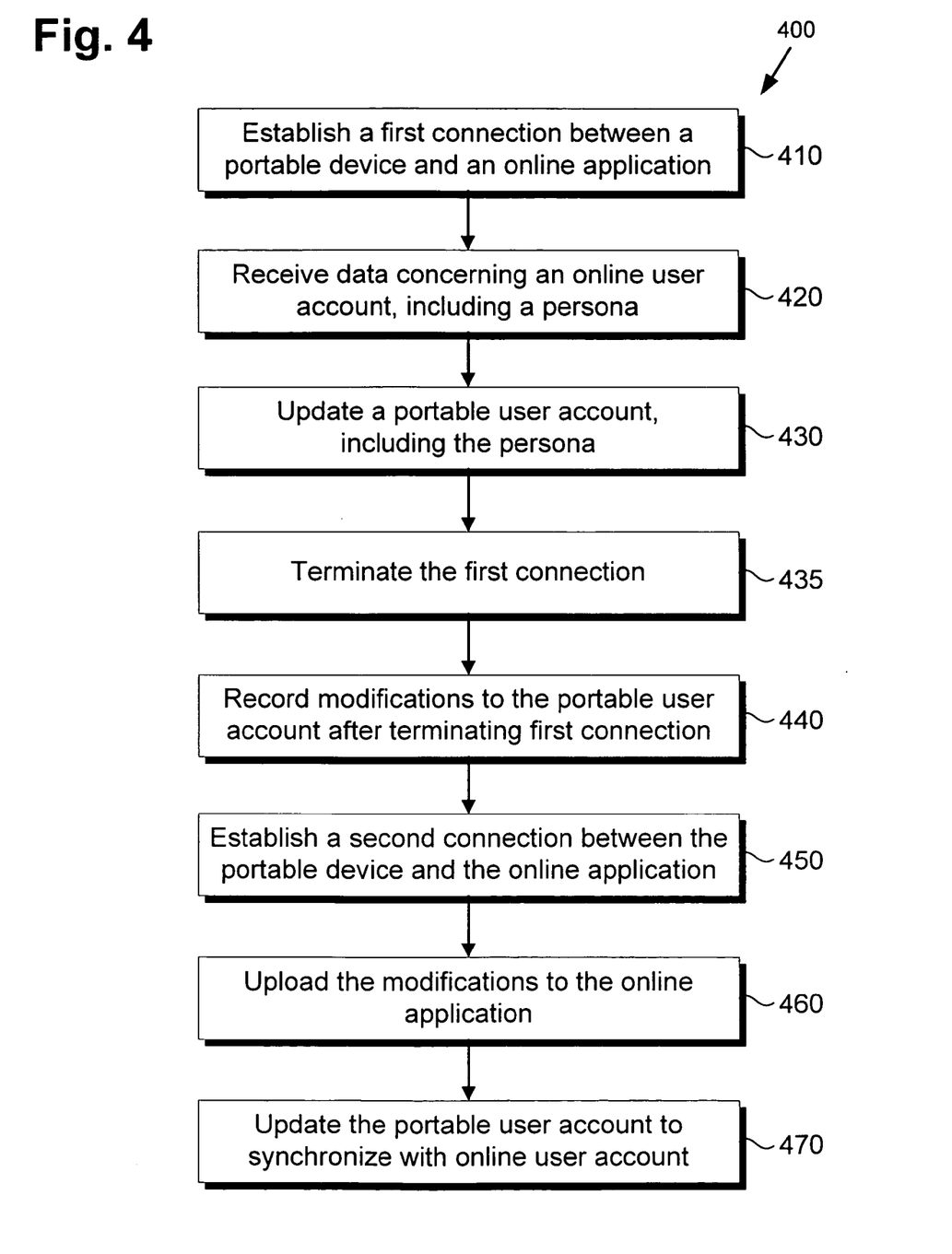
FIG. 4 shows a flowchart describing the steps, according to one embodiment of the present invention, by which an online user account may be synchronized by a portable device.

Now that the synchronization system and time progression diagram have been laid out in some detail, the next drawing, FIG. 4, shows flowchart 400 describing the steps, according to one embodiment of the present invention, by which an online user account may be synchronized with a portable device. Certain details and features have been left out of flowchart 400 that are apparent to a person of ordinary skill in the art. For example, a step may comprise one or more substeps or may involve specialized equipment or materials, as known in the art. While steps 410 through 470 indicated in flowchart 400 are sufficient to describe one embodiment of the present invention, other embodiments of the invention may utilize steps different from those shown in flowchart 400.

Referring to step 410 of flowchart 400 in FIG. 4 and synchronization system 100 of FIG. 1, step 410 of flowchart 400 comprises establishing a first connection between portable device 160 and online application 140. On the timeline of FIG. 3, this may correspond to the beginning of time interval 301. This initial step is to prepare portable device 160 to receive data concerning online user account 130 from online application 140. Referring to FIG. 1, this first connection may be established with communication link 146 or communication links 145 and 155, which may, as discussed, be accomplished using a USB connector or a wireless connection, for example.

Continuing with step 420 in FIG. 4 and synchronization system 100 of FIG. 1, step 420 of flowchart 400 comprises receiving data concerning online user account 130 from online application 140, including a persona. On the timeline of FIG. 3, this may correspond to the beginning of time interval 301. In one embodiment, online application 140 may comprise a multiplayer online gaming environment. However, alternative embodiments are possible; it could, for example, comprise a virtual world, where there is no "goal" other than simply living out a different online life. More particularly in the present example, online application 140 may comprise a medieval fantasy based massively multi-player online role-playing game (MMORPG), which will be referred to as "Caliburn Online." Online user account 130 may contain a wide variety of data sets that resemble the data sets listed in portable user account 270 in FIG. 2, including a persona, application data assets, and account identifiers and personal information. Depending on the capabilities of portable application 180, some or all of these data sets may be received on portable device 160.

For example, limited storage on portable device 160 may dictate that application data assets 272 should receive only a limited subset of artwork assets to conserve disk space. This might, for example, comprise the bare minimum artwork assets to graphically render persona 271 on portable device 160, such as artwork files pertaining to the currently worn clothing and physical features of persona 271. Due to the limited artwork assets available to portable device 160, it may be further configured to prevent the user from changing the persona's clothing or appearance. However, for the purposes of the present example, portable hardware 290 may be sufficiently powerful to receive all data sets and allow full persona customization offline.

In addition, customized versions of these data assets may be provided to portable device 160 to match the hardware capabilities of portable hardware 290. For example, three-dimensional models might be rendered into two-dimensional sprites, high-resolution artwork might be resized to a lower resolution, and animations might be reduced to still frames. These customized versions could be built from scratch specifically for portable device 160, or could be extrapolated from the original data. For the present example, portable hardware 290 may be sufficiently powerful to receive the data sets without these customizations.

These data sets may, for example, indicate that the user has on file an archer named Roger as a persona, existing in the Caliburn Online world as an avatar of the user. As a ranged weapons specialist, Roger has 50 skill points in archery and a crossbow at his side. Roger also has a unique fashion sense, sporting a flamboyant winged hat on his head and a heart shaped tattoo on his right arm. Since Roger is a relative newcomer, his virtual possessions are modest, totaling 1,000 gold pieces and a small virtual house in the countryside. All these data sets concerning Roger and the application data assets to render them, such as the tattoo design and the winged hat graphic, for example, may be received on portable device 160 in step 420. Depending on the implementation of portable application 180, these data assets may already exist on the portable device to decrease the amount of data to transfer, decreasing the transfer time required as well. If the communication link utilized by portable device 160 is slow, it will be especially important to expedite the transfer since broad user adoption may depend on the speed and ease of synchronization.

For example, application data assets 272 in FIG. 2 may store a local database of all art assets related to clothing and other visual customizations available to online application 140. As previously discussed, these local assets might be customized versions to match the capabilities of portable hardware 290. Rather than storing only the art assets necessary for the current persona 271, application data assets 272 will store all art assets required for any valid permutation of persona 271. If online application 140 is of any non-trivial size, the number of art assets to be stored in the local database will be quite large. An initial version of this local database might be preloaded on portable device 160 to avoid a long initial synchronization. When transfer of data assets from online application 140 occurs, only metadata describing the required data assets will need to be transferred, as the actual data assets will already exist in application data assets 272. This metadata, for example, may be implemented in an Extensible Markup Language (XML) file generated by online application 140 or client application 151, and portable application 180 would be configured to read and process that XML file.

Using the Caliburn Online example, an XML file might indicate that Roger has a crossbow identified by database key X, a heart shaped tattoo identified by database key Y, and a winged hat identified by database key Z. The XML file would duly note that database keys X, Y, and Z are associated with persona 271. In addition, the XML file might include further metadata specific to those item instantiations, such as the repair condition of the crossbow, the dimensions and location of the tattoo on Roger's body, and possible enchantment bonuses placed on the normally mundane winged hat, such as adding 5 charm points to the wearer. Since these metadata details are particular to Roger's circumstances and not intrinsic to the items generally, the details will be absent from the database. Thus, these metadata details might instead be included in the XML file, but the XML file will not include data assets assumed to already exist in the local database, such as the actual graphical representations of these items or their normal intrinsic properties.

Using metadata in this manner will significantly expedite data transfer, but actual data assets may still need to be retrieved from online application 140. This is related to one of the compelling features of online application 140; namely constantly refreshed and updated content. For example, a new set of clothes might be released on a weekly basis, existing clothes may be changed, and certain clothes might be removed for various reasons, such as game balance or political sensitivity. Therefore, the initial local database will quickly find itself outdated, missing newly added and changed resources and retaining unwanted resources. Thus, when portable device 160 receives information regarding online user account 130, it may also receive new data assets related to newly added and modified clothes since the last update and also remove data assets marked for removal. Although these data assets may initially seem to be a separate element, they can be considered a part of the data sets encapsulated in online user account 130. Looking at FIG. 2 with the understanding that portable user account 270 is analogous and corresponds to online user account 130, it should be apparent that online user account 130 might also include application data assets similar to application data assets 272. Much like portable user account 270, the assets might be merely referenced by metadata, and the actual data might be hosted elsewhere on a database accessible to online network 110 as previously discussed.

Depending on application design goals, frequency of content updates, and other preferences, a solution involving XML metadata transfers with a local database may be adopted as discussed above, a simple download on demand solution might be used, or a mixture of both solutions might even be used for different data sets. Regardless of the particular implementation for transferring application data assets, after step 420 is completed, data concerning online user account 130, which may include metadata or actual application data assets, will be received on portable device 160.

At step 430 of flowchart 400, portable user account 170, including the persona, will be updated according to data received from step 420. On the timeline of FIG. 3, this may correspond to the middle of time interval 301. This step may interpret the data concerning online user account 130 received from the previous step, and format it suitably to be stored in portable user account 170. For example, certain data may be unused and thus discarded, or some data sets may arrive in a format that is unwieldy for portable application 180 to utilize, but amenable to a more convenient format after transformations are applied. This step could also conceivably synchronize an existing portable user account 170, but as mentioned for purposes of the present example, portable user account 170 starts in an empty state and is receiving data concerning online user account 130 for the first time. After this step is completed, portable user account 170 may contain data sets similar to portable user account 270 shown in FIG. 2, including persona 271.

At step 435 of flowchart 400, the first connection is terminated. This leaves portable device 160 in what is termed an offline state. Offline in this context means a lack of connectivity to online application 140. On the timeline of FIG. 3, this may correspond to the beginning of time interval 302. This step allows the user to use portable device 160 even though it is not connected to online application 140, giving the user the freedom to travel to locations that may not have connectivity to online application 140.

At step 440 of flowchart 400, modifications to portable user account 170 are recorded after the first connection is terminated. On the timeline of FIG. 3, this offline period may correspond to time interval 302. Step 440 may record modifications to portable user account 170 as a result of interactions between a user and portable device 160, for instance. As one example, consider that portable device 160 is a handheld gaming device with a touch sensitive LCD screen and buttons for interaction, and that portable application 180 comprises a series of mini games that the user can play. Of course, portable device 160 may also be any number of other embodiments, including a portable media player, a plush toy, a mobile phone, or a portable storage device. A portable media player or a mobile phone, although not primarily designed to play games, may nevertheless have the capability of doing so. A plush toy could interact by tactile and other sensory feedback rather than conventional buttons and a screen. A portable storage device, in conjunction with a more capable device such as a standalone video game console, could also act as a suitable portable device 160. However, for the purposes of the present example, the conventional handheld gaming device will be used.

Consider that one of the offered mini games is an archery tournament, which uses the touch sensitive LCD screen for aiming. Perhaps these mini games can also be played independently of online application 140, using a generic preset character whose progress will only remain on portable device 160. However, thanks to the earlier steps of interfacing with online application 140, the visual depiction of Roger on the LCD screen may match his appearance in online application 140, including the flamboyant winged hat and the heart shaped tattoo. Additionally, time spent and progress earned for Roger will be recorded to portable user account 170 for future use by online application 140. Returning to the archery mini-game, the aiming cursor may be programmed to randomly wobble to simulate unsteady hands. Furthermore, the strength of the wobble may be programmed to inversely scale with archery skill level. Thus, the 50 archery skill points Roger possesses gives him a clear edge over an archery amateur, whose aim might fly all over the screen. As a result of Roger's stunning performance, the mini game grants 2 additional archery skill points to Roger, and tournament prizes in the form of 200 gold pieces and a bright green cape. However, wear and tear on his trusty crossbow finally caused it to break at the end of the tournament. These skill, money, and item changes may be written to portable device interaction log 273 shown in FIG. 2.

Further consider that portable application 180 allows customization of the character, including changing clothes and even drawing tattoos. Roger thus dons his brand new bright green cape right away. However, Roger finds that his heart shaped tattoo clashes with his new wardrobe. In a tattoo drawing mini game provided by portable application 180, Roger removes his old heart shaped tattoo and draws a new star shaped tattoo using the touch sensitive LCD screen. These changes to Roger's appearance may be written to portable device interaction log 273 shown in FIG. 2.

Another mini game that might be provided by portable application 180 is a pet nurturing simulator. Roger might decide to adopt a Siberian Husky, seeing a potential companion for exploring the cold northern reaches of Caliburn Online's world. Using the touch sensitive LCD screen and the buttons to interact, the user might name it Max, and through a series of mini games, feed it, bathe it, groom it, train it, and play games with it, like dog sled races. Max and his interactions with the user might be recorded to portable device interaction log 273 shown in FIG. 2.

In addition, portable device 160 may have the capability of communicating with other portable devices to chat, trade or gift items, and play games, for example. Roger takes advantage of this capability by connecting to another user's portable device through infrared communication. During a chat session, Roger becomes convinced that he needs to live closer to the city to become more sophisticated. Roger thus negotiates a trade, exchanging his house in the country for a shack in the city. All these modifications to portable user account 170, including the tournament results, the change of appearance, the Siberian Husky Max, and the house trade may be recorded into portable device interaction log 273 shown in FIG. 2.

At step 450 of flowchart 400, a second connection is established between portable device 160 and online application 140. On the timeline of FIG. 2, this may correspond to the beginning of time interval 303. Step 450 may prepare portable device 160 to send portable device interaction log 273 created from the previous step 440 to online application 140. This connectivity can be accomplished in much the same way as step 410 of flowchart 400, as previously described.

At step 460 of flowchart 400, the modifications recorded to the portable device in step 440 are uploaded to online application 140. On the timeline of FIG. 3, this may correspond to the beginning of time interval 303. These modifications may be used by online application 140 to synchronize online user account 130, as shown in FIG. 5, which is explained in greater detail below.

At step 470 of flowchart 400, portable device 160 updates portable user account 180 based on modifications made to online user account 130. On the timeline of FIG. 3, this may correspond to the end of time interval 303. For example, consider that the Christmas holiday was encompassed during time interval 302 shown in FIG. 3. As a gesture of appreciation, every online user account might have been gifted with a free Santa hat on Christmas day. At this point, portable device 160 may proceed to download the graphic data for the Santa hat, and inform portable user account 170 that a Santa hat is another item in Roger's possession. Whether this change is actually noted by portable user account 170 may depend on the capabilities and design of portable application 180. Regardless, at this point, portable device 160 may consider itself to be synchronized and up-to-date, and it leaves online application 140 to update and synchronize itself as well, which is described in further detail immediately below.

Figure 5:
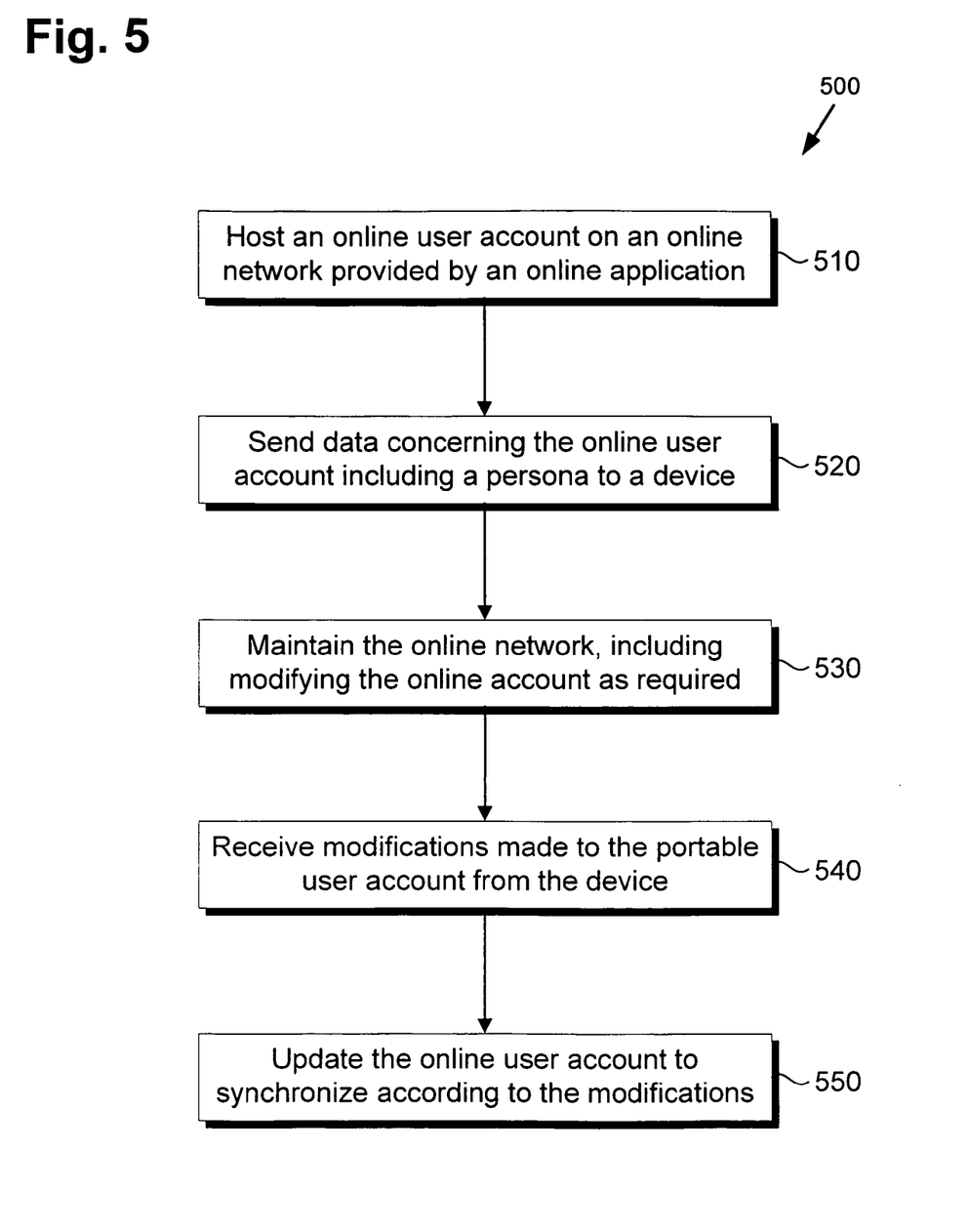
FIG. 5 shows a flowchart describing the steps, according to one embodiment of the present invention, by which an online user account may be synchronized by an online application.

Continuing with FIG. 5, FIG. 5 shows flowchart 500 describing the steps, according to one embodiment of the present invention, by which an online user account may be synchronized by an online application. Certain details and features have been left out of flowchart 500 that are apparent to a person of ordinary skill in the art. For example, a step may comprise one or more substeps or may involve specialized equipment or materials, as known in the art. While steps 510 through 550 indicated in flowchart 500 are sufficient to describe one embodiment of the present invention, other embodiments of the invention may utilize steps different from those shown in flowchart 500.

Referring to step 510 in FIG. 5 and synchronization system 100 of FIG. 1, step 510 of flowchart 500 comprises hosting online user account 130 as part of online network 110 provided by online application 140. A prerequisite of this step is that there is a valid online user account 130 already registered with synchronization system 100. Continuing the Caliburn Online example discussed with FIG. 4, the user account associated with the Roger persona will be previously registered and established as online user account 130. After an initial registration, which may, for example, be accomplished by an online signup website that gathers personal information and billing details, online application 140 will continuously host online user account 130 on online network 110.

Although there may be various contingencies where online application 140 may suspend or stop hosting online user account 130, such as, for example, power or network outages, scheduled maintenance, violations of account terms of service, non-payment of account fees, voluntary user withdrawal, or disbanding of the online application, for the sake of simplicity, none of these contingencies shall be considered in this example. Thus, on the timeline of FIG. 3, time intervals 301, 302, and 303 will have online user account 130 hosted continuously on online network 110 provided by online application 140.

Continuing with step 520 in FIG. 5 and synchronization system 100 of FIG. 1, step 520 of flowchart 400 comprises sending data concerning online user account 130 to a device. On the timeline of FIG. 3, this may correspond to the beginning of time interval 301. This step corresponds to step 420 in FIG. 4 as previously detailed, except that online application 140 is performing the action, and the target device is a generic device rather than a portable device specifically. This allows for online application 140 to communicate with client machine 150 as an intermediary, or directly with portable device 160. A suitable communication link will be already previously initiated from client machine 150 or portable device 160. At this point, online application 140 may dictate the datasets selected, their formatting, and the method of transfer. As discussed with the Caliburn Online example, all datasets in online user account 130 are transferred to portable device 160.

At step 530 of flowchart 500, online network 110 will be maintained during an offline interval in which portable device 160 is disconnected from online application 140. On the timeline of FIG. 3, this may correspond to time interval 302. To further clarify, the term offline interval only signifies that portable device 160 is disconnected from online application 140; online network 110 may still have connectivity to a wide area network such as the Internet, and may continuously host online user account 130 even during time interval 302. The procedures for maintaining online user account 130 will vary depending on the logic of online application 140 and possible connections to client machine 150.

For example, some users may leave client machine 150 continuously connected to online application 140 even though the user is physically away from client machine 150. A user might do this if the character is a merchant that may function to buy and sell goods in the city even without the interaction of the user. In this example, online user account 130 will be continuously changing during time interval 302 as the inventory and finances of the character will be fluctuating as other users buy and sell from the merchant character. However, for the purposes of the present example, there will be no communication link between client machine 150 and online application 140 during time interval 302.

Continuing with the Caliburn Online example, it has been mentioned that a Santa hat might be given to all users as a token of gratitude. The logic to carry this out would be executed by online application 140 on Christmas day, previously stipulated to occur during time interval 302. Thus, online application 140 would be scheduled to add a Santa hat to all user inventories on Christmas day, and may update its database resources to include a new Santa hat graphic. Alternatively, substantially nothing may happen during time interval 302, in which case online user account 130 might remain untouched. However, for the purposes of the present example, Santa hats will be distributed to users.

At step 540 of flowchart 500, online application 140 will receive modifications made to portable user account 170 during the offline interval corresponding to time interval 302. On the timeline of FIG. 3, this may correspond to the beginning of time interval 303. This step corresponds to step 460 in FIG. 4 as previously detailed, except that online application 140 is performing the action. A suitable communication link will be already previously initiated from portable device 160 or client machine 150.

At step 550 of flowchart 500, online application 150 will update online user account 130 according to the modifications made to portable user account 170 received from step 440. On the timeline of FIG. 3, this may correspond to the middle of time interval 303. Continuing with the Caliburn Online example, there have been many changes recorded in portable device interaction log 273 that may impact online user account 130. The additional 2 archery skill points may be duly noted, updating Roger in online user account 130 from 50 to 52 archery skill points total. The additional 200 gold pieces may update online user account 130 from 1,000 to 1,200 gold pieces total. Rumors of Roger's crossbow expertise demonstrated at the offline archery tournament might begin circulating within the online world, prompting the local Archer's Guild to extend Roger an invitation to their exclusive club. The appearance of Roger online will also be updated to remain consistent with the state of portable user account 170, complete with the new bright green cape, the new custom designed star shaped tattoo, and the now broken crossbow slung across his shoulder. Roger might also find a new loyal companion following him around, Max the Siberian Husky. Due to Roger's excellent job in nurturing and training Max, the online version of Max is given especially high running endurance and a loyal predisposition to his owner. In addition, Roger might find that the keys to his countryside house are replaced with the keys to the shack in the city. This particular swap of virtual properties might occur earlier internally if Roger's trading partner synchronized with online application 140 earlier than Roger. However, the apparent result will be the same to the user; whenever Roger reconnects to online application 140, the results of the trade will be immediately apparent. There may also be a pleasant surprise waiting for Roger in his inventory as well; the aforementioned free Santa hat.

After online application 140 notes modifications to portable user account 170 and decides how to modify online user account 130 accordingly, it proceeds to execute that logic, synchronizing online user account 130 and making it up-to-date and consistent with the status of portable user account 170. At this point, the work of the online application in synchronizing may be completed and it leaves portable device 160 to update itself accordingly as well, which is previously described in step 470 of FIG. 4.

As described in the foregoing, a method and system for synchronizing an online user account and a portable device supports a seamless user experience between an online application and a portable device. No longer are portable devices and online applications limited to separate and distinct sets of account data, never to meet. With the method and system of the present invention, a user can interact with the online user account as desired even in the context of a portable device. Since the portable device can record modifications to the portable user account while disconnected from the online application, and the online application can use those records to update and synchronize the portable user account with the online user account, there is no worry that any progress accomplished on the portable device will not successfully carry over to the online application. As a result, users of online applications are liberated from the requirements of bulky, immobile equipment and constant online access.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method implemented by a portable device having a display, a memory storing avatar assets, and a processor for communication with an online application being executed by one or more servers, the method comprising:

establishing, by the processor, a first connection between the portable device and the online application, wherein the portable device includes a portable application;

receiving, by the processor, avatar metadata from the online application, wherein the metadata describes physical, social and statistical attributes of the avatar that represents a user associated with an online user account for using the online application;

terminating the first connection between the portable device and the online application after receiving the avatar metadata;

creating, by the processor and after terminating the first connection, the avatar using one or more of the avatar assets stored in the memory according to the avatar metadata describing the physical attributes of the avatar;

displaying, by the processor, the created avatar on the display;

recording in the memory, by the processor, first modifications by the user to the physical, social and statistical attributes of the displayed avatar using the portable application;

establishing, after recording the first modifications in the memory, a second connection between the portable device and the online application;

uploading, by the processor using the second connection, the first modifications to the physical, social and statistical attributes of the avatar recorded in the memory, to the online application;

receiving, by the processor using the second connection, second modifications to the online user account from the online application, the second modifications to the online user account occurring after terminating the first connection and includes at least one additional avatar asset; and updating, by the processor, the portable device using the second modifications received from the online application.

2. The method of claim 1, wherein the receiving of the avatar metadata includes receiving an Extensible Markup Language (XML) file including the avatar metadata.

3. The method of claim 1, wherein the portable device and the online application communicate via an intermediary client machine, and wherein the intermediary client machine is one of a personal computer or a video game console.

4. The method of claim 1, wherein the portable device is one of a portable gaming device, a portable media player, a plush toy, a mobile phone, or a portable storage device.

5. The method of claim 1, wherein the online application comprises a virtual world.

6. The method of claim 1, wherein the online application comprises a multiplayer gaming environment.

7. The method of claim 1, wherein the physical attributes of the avatar include a clothing of the avatar, and wherein the first modifications include a modification to the clothing of the avatar that represents the user associated with the online user account.

8. The method of claim 1, wherein the physical attributes of the avatar include an equipment of the avatar, and wherein the first modifications include a modification to the equipment of the avatar that represents the user associated with the online user account.

9. The method of claim 1, wherein the physical attributes of the avatar include a money of the avatar, and wherein the first modifications include a modification to the money of the avatar that represents the user associated with the online user account.

10. The method of claim 1, wherein the physical attributes of the avatar include a virtual real property of the avatar, and wherein the first modifications include a modification to the virtual real property of the avatar that represents the user associated with the online user account.

11. The method of claim 1, wherein the physical attributes of the avatar include goods of the avatar, and wherein the first modifications include a modification to the goods of the avatar that represents the user associated with the online user account.

12. A portable device for communication with an online application being executed by one or more servers, the portable device comprising:

a display;
a processor;
a storage device storing avatar assets; and
a portable application residing in the storage device and executable by the processor causing the processor to perform the operation of:
establishing a first connection between the portable device and the online application, wherein the portable device includes a portable application;
receiving avatar metadata from the online application, wherein the avatar metadata describes physical, social and statistical attributes of the avatar that represents a user associated with an online user account for using the online application;
terminating the first connection between the portable device and the online application after receiving the avatar metadata;
creating, after terminating the first connection, the avatar using one or more of the avatar assets stored in the storage device according to the avatar metadata describing the physical attributes of the avatar;
displaying the created avatar on the display;
recording, in the storage device, first modifications by the user to the physical, social and statistical attributes of the displayed avatar using the portable application;
establishing, after recording the user modifications in the storage device, a second connection between the portable device and the online application;
recording, using the second connection, the first modifications to the physical, social and statistical attributes of the avatar recorded on the storage device, to the online application;
receiving, using the second connection, second modifications to the online user account from the online application, the second modifications to the online user account occurring after terminating the first connection and includes at least one additional avatar asset; and
updating the portable device using the second modifications received from the online application.

13. The portable device of claim 12, wherein the receiving of the avatar metadata includes receiving an Extensible Markup Language (XML) file including the avatar metadata.

14. The portable device of claim 12, wherein the portable device and the online application communicate by an intermediary client machine, and wherein the intermediary client machine is one of a personal computer or a video game console.

15. The portable device of claim 12, wherein the portable device is one of a portable gaming device, a portable media player, a plush toy, a mobile phone, or a portable storage device.

16. The portable device of claim 12, wherein the physical attributes of the avatar include a clothing of the avatar, and wherein the first modifications include a modification to the clothing of the avatar that represents the user associated with the online user account.

17. The portable device of claim 12, wherein the physical attributes of the avatar include an equipment of the avatar, and wherein the first modifications include a modification to the equipment of the avatar that represents the user associated with the online user account.

18. The portable device of claim 12, wherein the physical attributes of the avatar include a money of the avatar, and wherein the first modifications include a modification to the money of the avatar that represents the user associated with the online user account.

19. The portable device of claim 12, wherein the physical attributes of the avatar include a virtual real property of the avatar, and wherein the first modifications include a modification to the virtual real property of the avatar that represents the user associated with the online user account.

20. The portable device of claim 12, wherein the physical attributes of the avatar include goods of the avatar, and wherein the first modifications include a modification to the goods of the avatar that represents the user associated with the online user account.

* * * * *